UNITED STATES PATENT OFFICE.

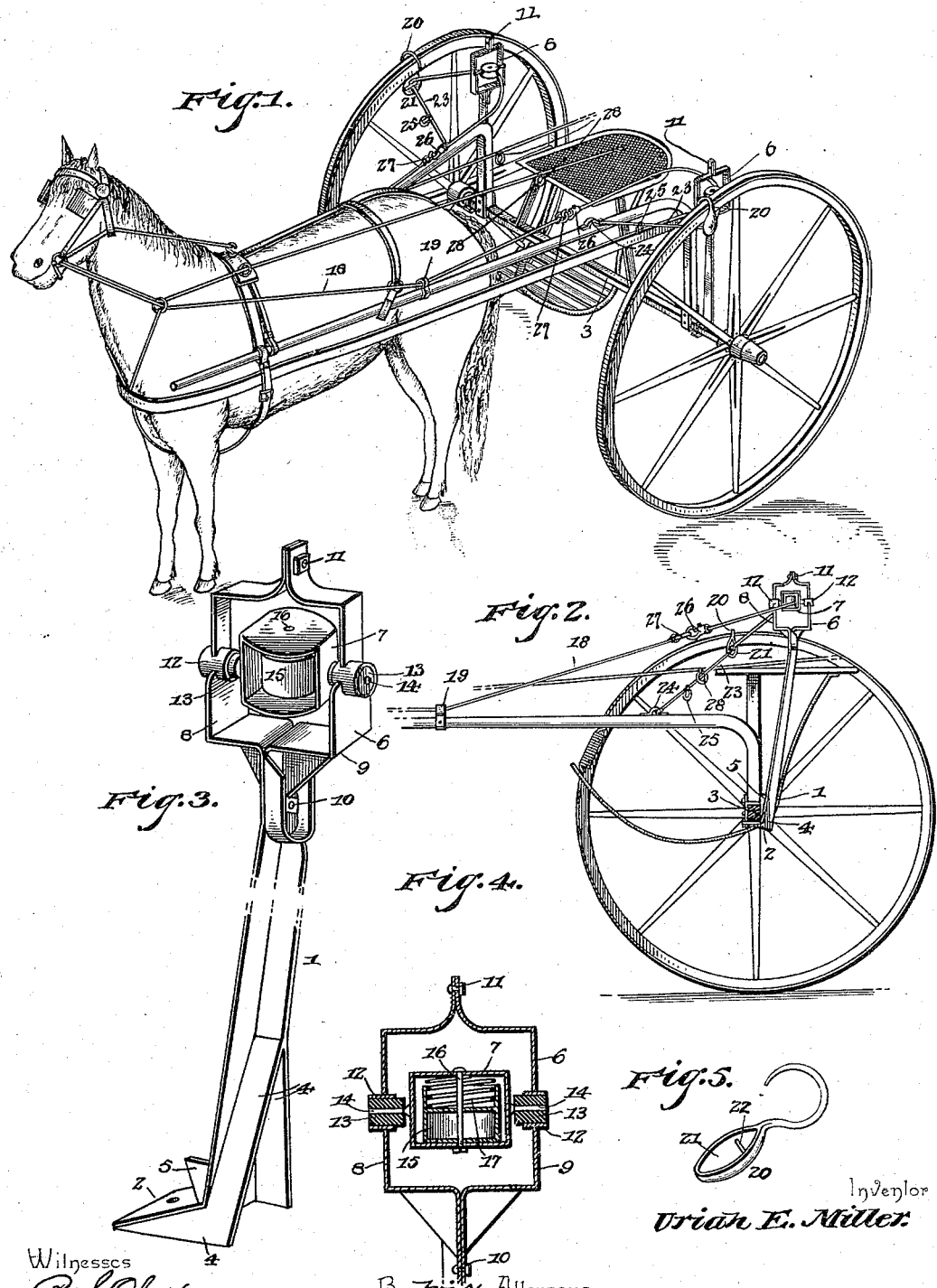

URIAH E. MILLER, OF HEILIG'S MILL, NORTH CAROLINA, ASSIGNOR OF ONE-HALF TO PAUL BARRINGER, OF SAME PLACE.

HORSE-HITCHING DEVICE.

SPECIFICATION forming part of Letters Patent No. 537,842, dated April 23, 1895.

Application filed September 7, 1894. Serial No. 522,386. (No model.)

*To all whom it may concern:*

Be it known that I, URIAH E. MILLER, a citizen of the United States, residing at Heilig's Mill, in the county of Rowan and State of North Carolina, have invented a new and useful Horse-Hitching Device, of which the following is a specification.

This invention relates to improvements in horse hitching devices.

The object of the present invention is to provide for vehicles a hitching device whereby a draft animal or animals will be securely held against forward or backward movement, and which will dispense with the ordinary hitching strap or line, and weight or post.

The invention consists in the construction and novel combination and arrangement of parts hereinafter fully described, illustrated in the accompanying drawings, and pointed out in the claims hereto appended.

In the drawings—Figure 1 is a perspective view of a vehicle provided with a hitching device constructed in accordance with this invention. Fig. 2 is a longitudinal sectional view of the rear portion thereof. Fig. 3 is an enlarged detail perspective view of the standard, showing the pulley and the pivoted frame. Fig. 4 is a detail sectional view of the top of the standard. Fig. 5 is a detail view of the hook.

Like numerals of reference indicate corresponding parts in all the figures of the drawings.

1 designates a standard, designed to be secured to an axle at each side of a vehicle, and provided with a foot portion 2, which is arranged beneath an axle 3, and which is secured thereto by a clip passing over the axle. The standard is provided on its rear face and the bottom of the foot portion 2, with supporting flanges 4, and it has on its front side adjacent to the foot portion bearing flanges 5, which engage the rear side of the axle.

At the top of the standard is a substantially rectangular bearing frame 6, receiving a pivot frame 7, and consisting of sides 8 and 9. The side 8 is formed integral with the standard; and the other side 9, is constructed separate and secured at its ends by bolts 10 and 11, to the standard and to the top of the side 8; and these sides are provided with horizontal sockets 12, receiving cushions 13.

The cushions 13 consist of cylindrical blocks of rubber and form bearings for journals 14, of the pivot frame 7, to enable the latter to swing noiselessly. In the pivoted frame 7, is journaled a pulley 15, which is mounted on a bolt 16, and which is held, normally, against the lower portion of the pivot frame by a spiral spring 17, seated in a recess or cavity in the top of the pulley, and designed to render the pulley noiseless.

A hitching strap or line 18, which is connected to the bit and which passes through hame rings, or the like, and a guide 19, of the adjacent shaft, passes rearwardly around the pulley and has secured to it a hook 20, which is adapted to engage the rim of the adjacent wheel, and which is provided with a weighted handle portion 21. The hook is provided with a transverse piece 22, to which is connected the hitching strap or line, and a short strap 23 extending from the hook to a loop or keeper 24, of the adjacent shaft.

When it is desired to hitch the draft animal, the hook 20, which is provided with a contracted mouth or entrance, is engaged over the rim of the wheel, and the handle portion being weighted, prevents any accidental disengagement. If the horse should attempt to move forward, the hitching straps or lines will be drawn backward by the forward rotation of the wheel, instantly checking the animal, and should it attempt to back, the wheels will be positively locked. If the animal should attempt to turn to the right or left, the wheel which moves forward will draw the companion hitching strap or line rearward and bring the horse back to its proper position.

The connecting strap or line is provided with a loop or keeper 25, to receive the hook when the latter is not in use; and the hitching straps or lines are provided with snap hooks 26, and rings 27, to enable them to be readily disconnected when it is desired to permit a horse to water at a stream. The driving lines are provided with rings 28, which may be connected with the snap hooks when desired.

In extreme cases, with vicious horses, the traces can be disconnected from the road cart, thereby throwing the entire weight of the vehicle, with the wheels locked, on the hitching lines. This forms an effective check, and will prevent such horses from moving forward.

It will be seen that the hitching device is simple and comparatively inexpensive in construction and positive and reliable in operation, and that it dispenses with the ordinary hitching strap and weight, and hitching posts.

It will also be seen that by making the hitching straps or lines separable it is unnecessary to leave the vehicle when it is desired to water the draft animal.

It will also be understood that the hitching apparatus may be readily applied to any ordinary vehicle employing either one or two horses.

Changes in the form, proportion, and the minor details of construction may be resorted to without departing from the principle or sacrificing any of the advantages of this invention.

Having described my invention, what I claim is—

1. The combination with a vehicle, of upward extending standards located between the wheels and the body of the vehicle and mounted on the axle and provided at their tops with pulleys, hitching lines passing around the pulleys and designed to be connected at their front ends with the bit, and hooks carried by the said lines for engaging the rims of the adjacent wheels, substantially as described.

2. In a hitching device, the combination with a vehicle, of standards mounted on the axle adjacent to the wheels and provided with vertical pulleys, hitching lines designed to be connected to the bit and composed of sections having snap hook connections, said hitching lines passing around the pulleys, hooks connected to the rear ends of the hitching lines, and the short connecting straps extending from the hooks to the shafts and provided with loops for the reception of the hooks, substantially as and for the purpose described.

3. In a hitching device, the combination with a vehicle, of a hitching line, a standard secured to the axle and provided at its top with a rigid frame, a pivot frame journaled on the rigid frame, a pulley mounted in the pivot frame and receiving the hitching lines, and a hook connected with the hitching line, substantially as described.

4. In a hitching device, the combination with a vehicle, a hitching line, a standard secured to the axle and provided at its top with a rigid frame and having sockets at opposite sides thereof, elastic blocks arranged in the sockets, a pivot frame journaled in the elastic blocks, and a pulley mounted in the pivot frame and receiving the hitching line, substantially as described.

5. In a hitching device, the combination with a vehicle, a hitching line, a standard secured to the axle and provided at its top with a rigid frame and having sockets at opposite sides thereof, elastic blocks arranged in the sockets, a pivot frame journaled in the elastic blocks, a pulley mounted in the pivot frame and provided at its top with a recess, a bolt passing through the pulley, and a spiral spring seated in the recess and interposed between the pulley and the top of the pivot frame, substantially as described.

6. In a hitching device, the combination with a vehicle, of a hitching line provided with a hook, of a standard having a foot piece secured to the axle, said standard being provided with bearing flanges engaging the rear side of the axle, a rigid frame arranged at the top of the standard and composed of sides 8 and 9, the side 8 being formed integral with the standard, and the side 9 being bolted to the standard and to the top of the side 8, sockets arranged at opposite sides of the frame, elastic blocks fitted in the sockets, a pivot frame journaled on the elastic blocks, and the pulley mounted in the pivot frame and receiving the hitching line, substantially as described.

7. In a hitching device, the combination of a vehicle, a standard mounted on the axle and arranged adjacent to a wheel between the same and the body and carrying the pulley, a hitching line designed to be connected to the bit and passing around the pulley, and a hook connected intermediate of its ends to the hitching line and having a contracted mouth or entrance and provided with an extension forming a handle and holding the hook in proper position, substantially as and for the purpose described.

In testimony that I claim the foregoing as my own I have hereto affixed my signature in the presence of two witnesses.

URIAH E. MILLER.

Witnesses:
ALFRED MILLER,
LILLIE O. MILLER.